United States Patent
Nigro et al.

(10) Patent No.: US 12,275,110 B2
(45) Date of Patent: Apr. 15, 2025

(54) METHOD FOR DETECTING THE WEAR OF A MILLING CUTTER OF A KEY-DUPLICATING MACHINE

(71) Applicant: SILCA S.P.A., Vittorio Veneto (IT)

(72) Inventors: Gennaro Giovanni Nigro, Mareno di Piave (IT); Maurizio Ugel, Cordenons (IT); Giorgio Pigatti, Cordignano (IT)

(73) Assignee: SILCA S.P.A., Vittorio Veneto (IT)

( * ) Notice: Subject to any disclaimer, the term of this patent is extended or adjusted under 35 U.S.C. 154(b) by 0 days.

(21) Appl. No.: 17/772,984

(22) PCT Filed: Oct. 30, 2020

(86) PCT No.: PCT/IB2020/060195
§ 371 (c)(1),
(2) Date: Apr. 28, 2022

(87) PCT Pub. No.: WO2021/084487
PCT Pub. Date: May 6, 2021

(65) Prior Publication Data
US 2024/0149384 A1    May 9, 2024

(30) Foreign Application Priority Data
Oct. 31, 2019  (IT) .................. 102019000020168

(51) Int. Cl.
G05B 19/4065    (2006.01)
B23C 3/35       (2006.01)
B23Q 17/09      (2006.01)

(52) U.S. Cl.
CPC ............ B23Q 17/0995 (2013.01); B23C 3/35 (2013.01)

(58) Field of Classification Search
CPC .. B23Q 17/0995; B23Q 17/0961; B23C 3/35; G05B 2219/37252; G05B 2219/37256; G05B 19/4065
See application file for complete search history.

(56) References Cited

U.S. PATENT DOCUMENTS 5,571,957 A * 11/1996 Tanaka ............... G05B 19/4065
                                                              73/104
10,474,980 B1 * 11/2019 McCalib, Jr. .......... H04N 7/183
(Continued)

FOREIGN PATENT DOCUMENTS

EP        3001265 A1    3/2016
EP      105974886 A    9/2016
(Continued)

*Primary Examiner* — Santosh R Poudel
(74) *Attorney, Agent, or Firm* — Carmel Patent Agency; Robert Ballarini

(57) ABSTRACT

A method is disclosed for detecting the wear of a cutter in a key-duplicating machine, the cutter being provided with cutting sections to obtain bitting cuts on a key and being put in rotation by an electric motor. The method includes measuring, during at least one cutting cycle carried out by means of the cutter, the values of current and/or voltage absorbed/required by the motor for rotation of cutter and/or motor torque values exerted by the motor. The values thus detected are used to determine if there is wear of the cutting portions of the cutter and/or to quantify the wear of the cutting portions of the cutter.

12 Claims, 6 Drawing Sheets

(56) References Cited

U.S. PATENT DOCUMENTS

2016/0114412 A1* 4/2016 Bosch ................. G01B 11/303
                                                    356/601
2019/0119988 A1* 4/2019 Akhmadi Eko ........ C23C 16/34
2019/0152011 A1* 5/2019 Kummari ................ G06N 5/04

FOREIGN PATENT DOCUMENTS

EP           3100809 A1    12/2016
JP        2003276260 A  *  9/2003

* cited by examiner

METHOD FOR DETECTING THE WEAR OF A MILLING CUTTER OF A KEY-DUPLICATING MACHINE

CROSS-REFERENCE TO RELATED APPLICATIONS

The present application is a § 371 National Phase of PCT/IB2020/060195, filed Oct. 30, 2020, which claims priority of Italian Patent Application No. 102019000020168, filed Oct. 31, 2019, the entire contents of all of which are incorporated by reference herein as if fully set forth.

FIELD OF THE INVENTION

The present invention relates to a method for defining the wear of the cutter in a key-duplicating machine, as well as a milling device in which said method is implemented.

BACKGROUND

As is known, the machining for defining the bitting on the face of the shaft of a key is generally performed using a cutter which can be a disc, have a prismatic profile or a hacksaw, or with a candle. In particular, for example, while the bitting of the edge of the flat keys is obtained by means of a disk cutter, for the so-called "laser" or "trace" keys, the bitting, both internal and external, is performed by obtaining, by means of a end mill, a groove on one or both sides of the key blade.

Considering that the surface of the key stem is generally covered with a layer of nickel or other particularly hard metal, it happens that, after machining a few hundred keys, a notch/lip is created on the cutting edge of the cutter tool which, obviously, becomes more and more marked as the number of machining operations carried out by the tool itself increases. Basically, as a result of wear, the cutting edge of the cutter is no longer well sharpened.

Therefore, the bitting operation with a tool so worn is no longer precise and causes the formation—in correspondence with the contact area between the surface of the key and the notch/wear lip on the tip of the cutter tool—of a centesimal burr having a jagged conformation. The presence of this burr is quite undesirable as it defines a cutting profile and is in any case unpleasant to the touch.

In this context there is therefore the need to identify when, following use, the cutter reaches a state of wear such as to require its replacement.

An example of a method for defining the wear of the cutter in a key-duplicating machine is known from document EP 3100809 A1; this known method is based on detecting variations in the mechanical power of the spindle which rotates the aforementioned cutter. More in detail, the wear of the cutter of the key-duplicating machine is consequently interpreted on the basis of the measurements of these mechanical quantities.

SUMMARY

The object of the present invention is to propose a method and a milling device for a key-duplicating machine which allow to define in a precise and reliable way if the cutter is worn or is still efficient.

Another object of the invention is to propose a method and a device which allow to estimate when the cutter is worn and it is therefore necessary to replace it.

Another object of the invention is to propose a method and a device which allow to eliminate the unwanted effects deriving from the use of a worn cutter, such as the creation of burrs on the surface of the key blade.

Another object of the invention is to propose a method and a device which allow to obtain a high-quality key.

Another object of the invention is to propose a method and a device which allow to increase the useful life of the tool (cutter) used for the bitting processing of keys.

Another object of the invention is to propose a method and a device which allow to reduce the processing costs for the encryption of keys.

Another object of the invention is to propose a method and a device that can be used in an automatic key processing machine.

Another object of the invention is to propose a method and a device which are suitable for being inserted and integrated in an industrial and highly automated machine.

Another purpose of the invention is to propose a method and/or a device which are improvements and/or alternatives to traditional solutions.

Another object of the invention is to propose a method which can be implemented in a simple, rapid and low-cost manner.

Another object of the invention is to propose a device and/or a machine for processing keys which can be produced in a simple, rapid and low-cost manner.

Another object of the invention is to propose a method and/or a device and/or a machine for processing keys with an alternative characterization, both in functional and implementation terms, with respect to traditional ones.

All these objects, both individually and in any combination thereof, and others which will result from the following description, are achieved, according to the invention, with a method and with a milling device having the characteristics indicated in the appended claims.

BRIEF DESCRIPTION OF THE DRAWINGS

The present invention is further clarified hereinafter in a preferred embodiment thereof, given purely by way of non-limiting example with reference to the attached drawings, in which:

FIG. 1 is a perspective view of a keys duplicating machine of,

DETAILED DESCRIPTION OF THE PREFERRED EMBODIMENTS

Figure 1:
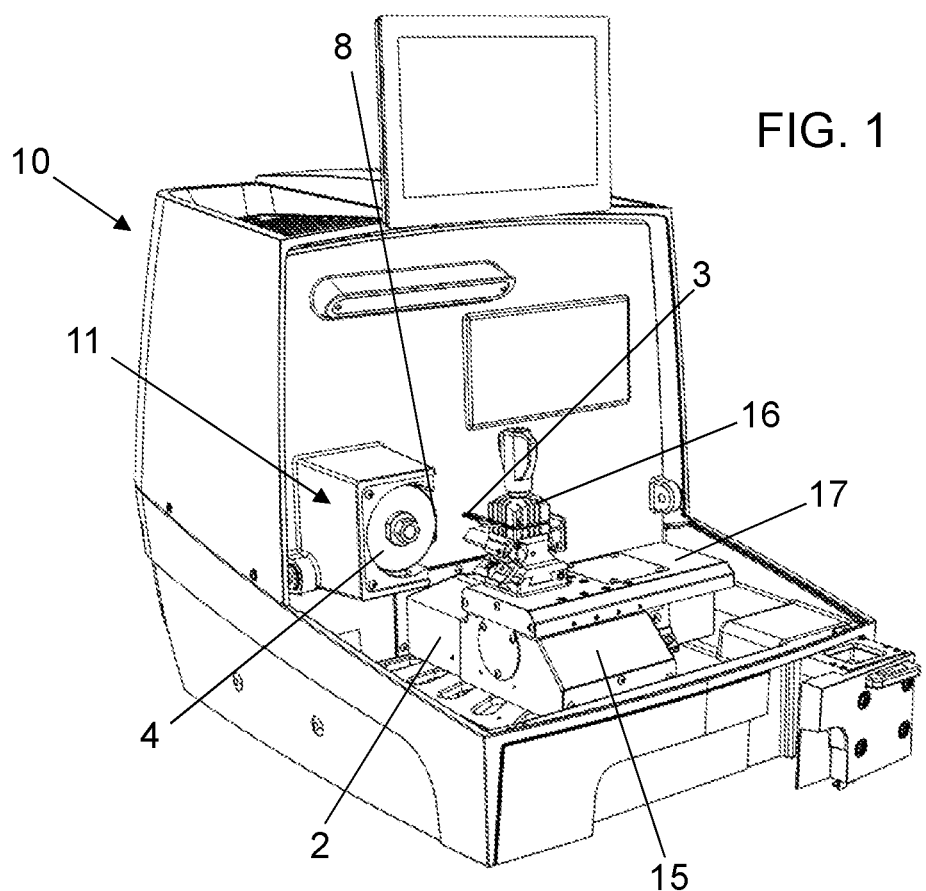

Conveniently, as is known, according to the traditional technique, to make the bitting slots on one or both side edges of the shaft of a traditional flat key 3, a milling cutter 4—preferably a disk milling cutter—which, suitably, is driven in rotation by a corresponding electric motor 5, is used as the machining tool.

Preferably, the disk cutter 4 comprises an annular element 6 which is mounted on a cutter holder shaft 7 and in which, along its outer edge, are obtained the cutting sections 8 of the cutter itself. Conveniently, the cutting portions 8 can have various toothed profiles.

Conveniently, on the other hand, an end mill is used to obtain the keyway or grooves on one or both faces of the shaft of a key 3—in particular in the case of so-called laser or trace keys. In particular, the end mill comprises a shank, for its assembly on the spindle of the machine tool, and a head in which the cutting sections of the mill itself are obtained.

Figure 2:
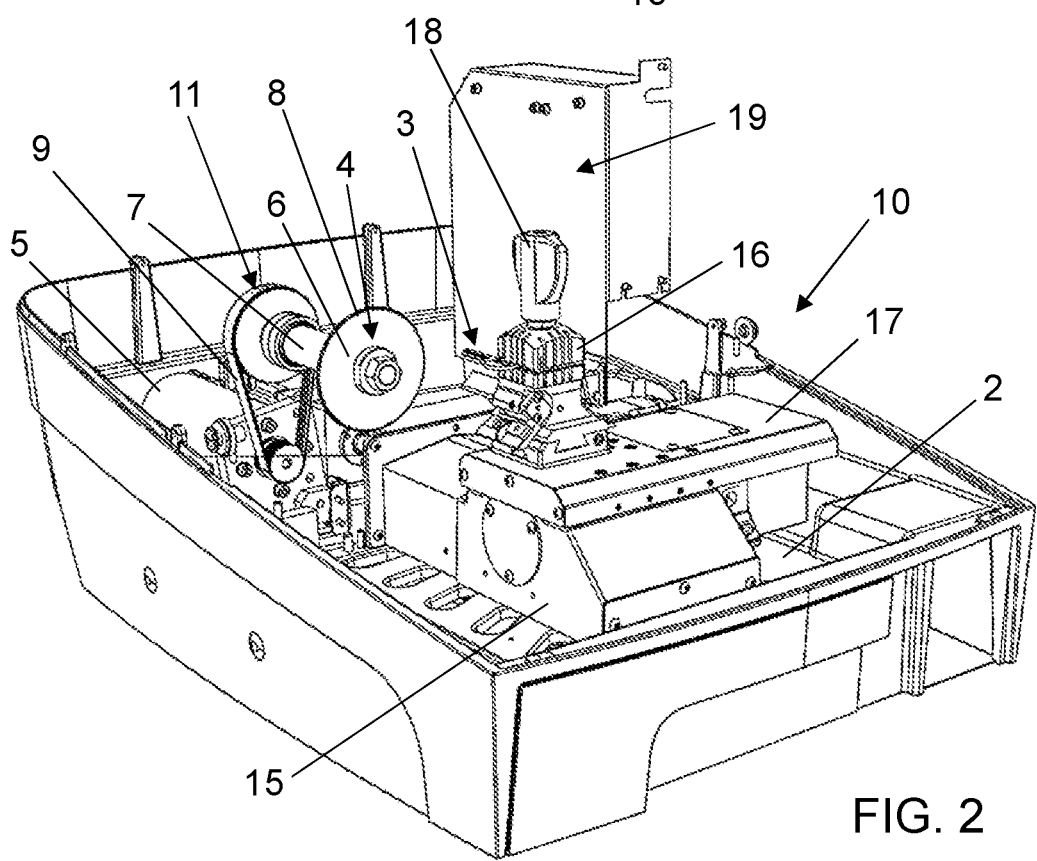
FIG. 2 shows a perspective view of the machine of FIG. 1 in which a part of the components has been removed.

As is known and as can be seen from FIGS. 1 and 2, an electronic key-duplicating machine 10 comprises at least one milling device 11 which, in turn, comprises a cutter 4 and a corresponding motor 5 for the rotation drive of said key cutter.

Furthermore, the output of the motor 5 is conveniently connected to the cutter 4, and in particular to the cutter holder shaft 7, by means of at least one mechanical transmission member 9, preferably by means of a transmission belt.

Preferably, the machine 10 comprises a base 2, on which a first carriage 15 associated with a second motor (not shown) is mounted, preferably of the stepper type, for the movement of the first carriage in both directions along a first horizontal axis Y of the machine.

Preferably, a second carriage 17 is mounted on the first carriage 15, which is associated with a third motor (not shown), also preferably of the step-by-step type, for moving the carriage with respect to the first carriage 15 in both directions along the horizontal X axis (which is perpendicular to the Y axis) of the machine.

Mounted on the second carriage 17 is a clamp 16 which comprises a support and two superimposed jaws mounted on a pin fixed to said support. Conveniently, the jaws have a square plan and the facing surfaces are differently shaped so as to be able to hold keys with different profiles.

Advantageously, a knob 18 is associated with the upper portion of the pin of the clamp 16, which has the function of controlling the approach and removal of the two jaws and their locking to the support.

The carriages 15, 17 are suitably controlled and made to advance with respect to the cutter 4 so as to obtain in sequence the corresponding bitting slots on the shaft of the key 3.

Conveniently, the machine 10 also comprises a control and management unit 19 for the entire machine. Conveniently, said control and management unit 19 comprises a processor. Advantageously, said unit 19 comprises memorization means and is electrically connected with the motors of the machine and with a plurality of sensors installed on the machine itself in order to manage and monitor its operation.

Conveniently, the milling device 11 comprises a processor which, preferably, can correspond to the processor defining the control and management unit 19 of the entire machine. Alternatively, the processor of the milling device 11 can be implemented in an electronic board separate from that of the processor 19 for controlling and managing the duplicating machine 10, even though the two processors are suitably connected to each other.

In particular, the processor of the milling device 11 is electronically connected with the drive motor 5 of the cutter 4 to send corresponding command and control signals to said motor.

Conveniently, moreover, the processor of the milling device 11 is electronically connected with the motor 5 so as to receive corresponding signals relating to the current/voltage absorbed by the motor 5 of the milling device 11.

In particular, the motor 5 is associated with and/or incorporates an instrument (not shown), for example an ammeter or a multimeter, to measure the intensity of current and/or voltage absorbed by the motor itself and to send a corresponding signal to the processor.

Conveniently, moreover, the processor of the milling device 11 can be electronically connected to the motor 5 so as to receive corresponding signals relating to the instantaneous motor torque (C) supplied in output by the motor. Conveniently, the processor itself is able to integrate said torque C over time, so as to associate it with the amount of energy supplied to the motor 5.

Conveniently, the current intensity and/or voltage absorbed by the motor 5 can be calculated and derived. on the basis of the signals detected and relating to the torque to the instantaneous motor torque (C) supplied at the motor output.

Conveniently, on the basis of the signals received and relating to the current/voltage absorbed by the motor 5 and/or the torque exerted by the motor itself, the processor is configured to calculate the corresponding values of power and/or energy absorbed by the motor itself.

Conveniently, in order to obtain all the slots that define a specific key bitting 3, a series of processes are carried out on the latter—by means of the cutter 4—which, together and/or in their sequence, define a cutting cycle.

Conveniently, the amount of electrical energy—which is required/absorbed by the rotation motor 5 of the cutter 4 in order to carry out a cutting cycle of a key using said cutter—depends on a series of factors, such as in particular:

the temperature of the motor 5 which turns the cutter 4,
the temperature of the transmission member 9 of the rotation motion to the cutter 4,
wear of the transmission component 9,
the rotation speed of the cutter 4 (corresponding to the cutting speed),
the speed with which the carriage(s) 15, 17, on which the key to be cut 3 is mounted, advances with respect to the cutter 4,
the material of the key blank to be cut 3,
the thickness of the key blank to be cut 3,
the number of cuts to be made on the key blank 3,
the depth of the cuts to be made on the key blank 3,
the state, and in particular the wear, of the cutting sections 8 of the cutter 4.

Conveniently, the temperature of the motor 5, the temperature of the transmission member 9 and the wear of the transmission member 9 have a substantially negligible weight compared to the remaining factors. Advantageously, moreover, the weight of the aforementioned three factors (motor temperature, transmission component temperature, transmission component wear) can be detected and estimated in the starting phase of the cutting cycle, when the motor 5 is switched on but the actual cut has not yet begun (since the cutter 4 has not yet come into contact with the key to be cut 3) and, therefore, the weight of the other factors is known and/or substantially nul. Conveniently, therefore, the estimated weight of the aforementioned three factors can define a corrective parameter to be considered during the operating phase of the cutting cycle, that is, when the cutter 4 comes into contact with the key 3.

Furthermore, suitably, the rotation speed of the cutter 3 and the speed of advancement of the carriages 15, 17 are known as they are preset.

Conveniently, therefore, the energy absorbed/required by the rotation motor 5 of the cutter 4 to complete a cutting cycle is proportional to the amount of work performed by the cutter 4 for the removal, according to the type of cut required, of a certain quantity of material (metal) from a given key blank 3 and, in particular, it depends on the wear of the cutting sections 8 of the cutter 4 given that a new cutter or in any case at the beginning of its useful life (and therefore having the cutting sections not worn) is much more efficient than a cutter with worn cutting edges.

The method according to the invention provides for detecting, during at least one cutting cycle carried out by means of said cutter 4, the current I and/or voltage V absorbed/consumed/required by the motor 5 and/or the torque C exerted by the rotation motor 5 of the cutter 4 and to use such detected value(s), and/or a plurality of calculated values (for example by integration over time, or by derivation with respect to time or one or more further quantities, such as for example time) to starting from the measured values, to determine if there is wear of the cutting sections 8 of said cutter 4 and/or to quantify the wear of the cutting sections 8 of said cutter 4.

Conveniently, the method according to the invention provides for calculating, on the basis of the current I and/or voltage V absorbed/consumed/required by the rotation motor 5 of the cutter 4, the corresponding values of power P and/or energy E, and to use this calculated value(s) to determine if there is wear of the cutting portions 8 of said cutter 4 and/or to quantify the wear of the cutting portions 8 of said cutter 4.

More in detail, the processor of the milling device 11 receives from the measuring instrument associated and/or incorporated with the motor 5 the values I of the current, and V of the voltage absorbed by the motor 5, and/or C of the torque exerted by the motor 5. In particular, the voltage V and the current I absorbed by the motor 5 and the torque C exerted by the motor 5 are measured according to a predefined sampling time Tc and, therefore, the processor receives a time sequence of voltage values Vn and current In and of torque Cn.

Conveniently, the processor of the milling device 11 is configured to calculate:
the power $P_n$, as $P_n = V_n \times I_n$, is corresponding to the n-th sample of power absorbed during the cutting cycle, or, alternatively as $P_N = C_N \times 2\pi \times f$, where f is the frequency in Hz of the motor 5.
the energy $E_T$, as $E_T = T_C * \Sigma_n P_n$ corresponding to the total energy absorbed for the execution of the cutting cycle.

Conveniently, in essence, this method involves measuring and quantifying the current I and/or voltage V and/or the torque C—and therefore to obtain the corresponding power P and/or energy E of rotation of the cutter 4 in the execution of a cutting cycle, and to correlate the energy value thus quantified with the state of wear of the cutting sections 8 of the cutter 4.

Advantageously, this correlation between the energy absorbed/consumed/required by the motor 5 and the state of wear of the cutting sections 8 of the cutter 4 is carried out by means of a lookup table defined empirically and/or on the basis of a predefined threshold value (for example on the basis of tests carried out externally, preferably in the laboratory) and/or on the basis of a control cutting operation carried out under predefined conditions on a known key used as a reference.

Figure 3:
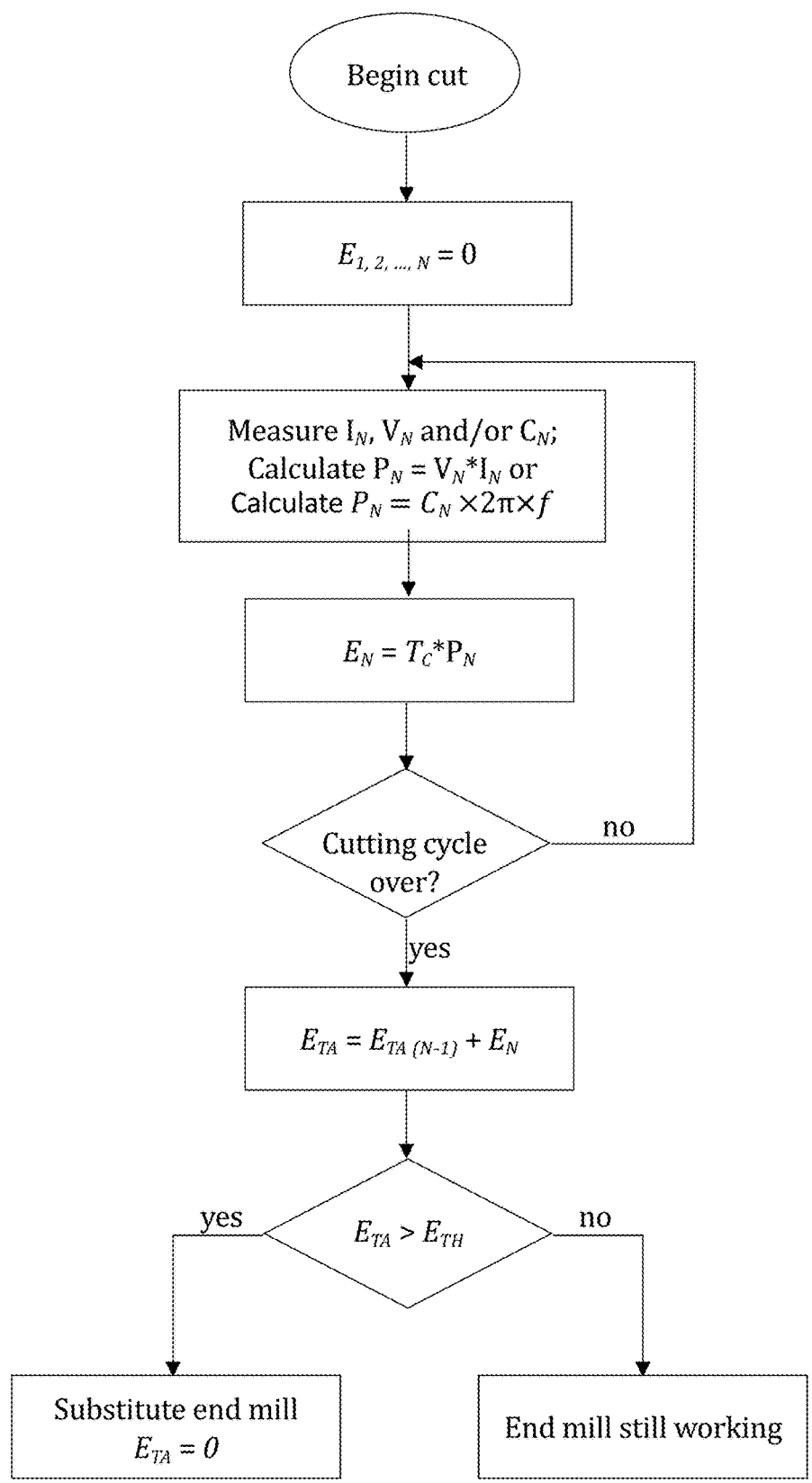
FIG. 3 shows a block diagram of a first embodiment of the method according to the invention.

Advantageously, as shown in FIG. 3, the method according to the invention provides for measuring the energy $E_1$—preferably in Wh—which is absorbed by the motor 5 driving the cutter 4 during a cutting cycle carried out to obtain the bitting of at least one key and to memorize this energy value $E_1$.

Preferably, a counter $E_{TA}$ is provided, which, at the beginning of the useful life of the cutter 4, is suitably initialized (for example to zero) and which is then correspondingly gradually increased with the measured energy value for each cutting cycle performed with the same cutter 4.

Therefore, after the first cutting cycle carried out with a new cutter 4, the counter $E_{TA}$ corresponds to $E_1$.

Advantageously, the processor is provided with and/or is connected to a reading memory unit/writing in which the value of the $E_{TA}$ counter is appropriately stored, once it has been updated with the last measurement carried out relating to the absorbed energy.

Conveniently, in the next cutting cycle a new value of energy $E_2$ is then measured absorbed by the motor and this value is added (accumulated) to the previous value $E_1$ thus obtaining a new value $E_{TA}$ which overwrites the previous one and which will correspond to $E_1 + E_2$.

Therefore, this last step is conveniently repeated for each cutting cycle; in particular, for each cutting cycle "N" the value of energy $E_N$ absorbed by the motor in that cycle is measured and this value is added (accumulated) to the value associated with the counter $E_{TA}$ (N−1) (i.e., the value of the counter before that cut), thus obtaining a new $E_{TA}$ value which overwrites the previous $E_{TA}$ (N−1).

Advantageously, the values $E_1, E_2, \ldots, E_N$ measured during the various cutting cycles are all saved and stored inside the processor of the device to thus define an archive useful for a comparative evaluation of the operating modes of the device between the various cutting cycles.

Conveniently, the total accumulated value $E_{TA}$ (preferably expressed in Wh) is compared with a predetermined threshold value $E_{TH}$ and:
the condition in which $E_{TA}$ is greater and/or equal to $E_{TH}$ is associated with a state of wear of the cutting portions 8 of said cutter 4, which must therefore be replaced;
the condition in which $E_{TA}$ is lower than $E_{TH}$ is associated with a state in which the cutting portions 8 of said cutter 4 are still efficient, and therefore it is not necessary to replace the cutter.

Preferably, this comparison can take place before the start of a new cutting cycle or at the end of a cutting cycle.

Advantageously, when the condition in which $E_{TA}$ is detected is greater and/or equal to $E_{TH}$, an appropriate warning is generated—preferably visual, for example by turning on a luminous indicator or by means of an appropriate signal or writing shown on the display of the duplicating machine 2—to indicate that the cutting sections 8 of said cutter 4 are worn and that, therefore, said cutter 4 must be replaced.

Conveniently, when the cutter 4 is replaced with a new cutter, the value of the counter $E_{TA}$ is reset to then be increased at each cutting cycle, carried out with the new cutter 4, with methods corresponding to those described above.

Advantageously, the threshold value $E_{TH}$ is empirically predefined.

Conveniently, by setting a series of threshold values $E_{TH}$ it is possible to define, according to the same methods described above (i.e., by comparing the counter $E_{TA}$ with said series of threshold values $E_{TH}$), a plurality of states, each of which corresponds at a different state/level of wear of the cutting sections 8 of said cutter 4.

Advantageously, the method according to the invention also provides for measuring and detecting the peaks of current absorption I by the motor 5 and/or of the torque C exerted by said motor 5 for rotation of the cutter 4 and to use the characteristics of said peaks (in particular in terms of amplitude and/or rate of growth) to determine if there is wear of the cutting portions 8 of said cutter 4 and/or to quantify the wear of the cutting sections 8 of said cutter 4. Conveniently, the method according to the invention provides for calculating the amplitude/height and/or the time/speed of growth of the peaks of the current absorbed by the motor 5 and/or of the torque C exerted by the motor 5 of rotation of the cutter 4, and to use this calculated value(s) to determine, on the basis of this (these), whether the cutting sections 8 of the cutter 4 are worn and/or the state of wear of said cutting sections 8. In particular, a cutter 4 with worn cutting sections 8 produces current absorption peaks (preferably expressed in W) which have a greater amplitude/height than those produced by a new and not yet used cutter, i.e., with non-worn cutting sections.

More in detail, the processor of the milling device 11 receives from the measuring instrument associated and/or incorporated with the motor 5 the values I of the current absorbed by the motor 5 and/or of the torque C exerted by the motor 5 and, on the basis of these, the processor is configured to calculate the amplitude/height of the current and/or torque peaks and/or the time/rate of growth of said peaks.

Figure 4:
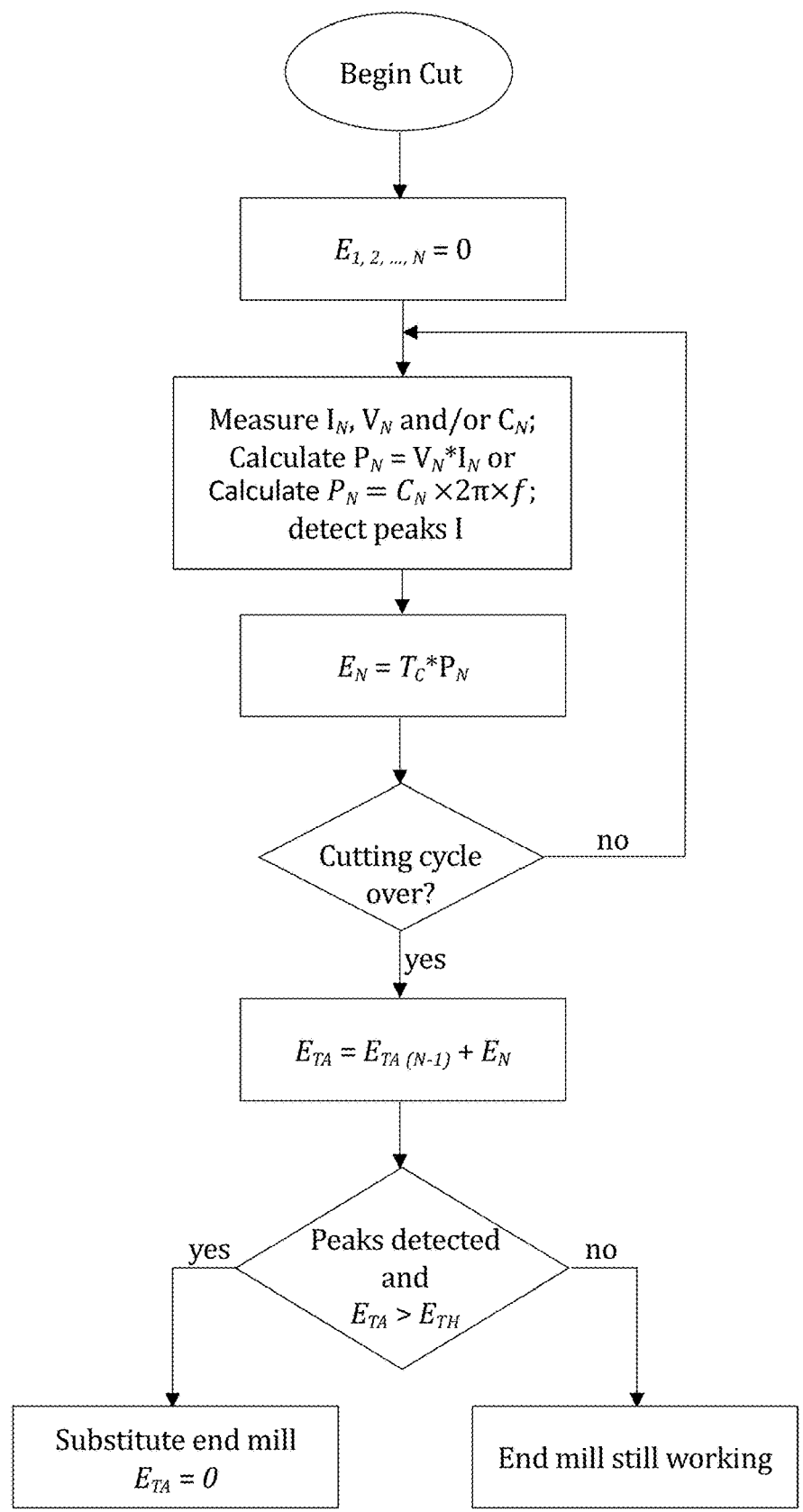
FIG. 4 shows a block diagram of a second embodiment of the method according to the invention.

Advantageously, as shown in FIG. 4, the method according to the invention provides to determine if there is wear of the cutting sections 8 of said cutter 4 and/or to quantify the wear of the cutting sections 8 of said cutter 4 on the base both of the characteristics of the current absorption peaks I by the motor 5 of rotation of the cutter 4 during a cutting cycle and of the energy absorbed by said motor 5 during all subsequent cutting cycles carried out with said cutter 4 (i.e., using the $E_{TA}$ counter as described above and comparing it with the threshold value $E_{TH}$).

In particular, in the implementation of the method according to FIG. 4, in addition to accumulating/memorizing the amount of energy absorbed by the rotation motor 5 of the cutter 4 during all the cutting cycles carried out with that specific cutter, the peaks of current absorption during a given cutting cycle are detected, calculated and evaluated; suitably, in this case, the total accumulated value $E_{TA}$ (preferably expressed in Wh) is compared with a predetermined threshold value $E_{TH}$ and, moreover, also the amplitude and/or area of the absorbed current peaks (AP) by the motor 5 and/or the torque C exerted by said motor 5 during that determined cutting cycle is compared with a corresponding predetermined threshold value $A_{TH-P}$; following this comparison:

the condition in which $E_{TA}$ is greater and/or equal to $E_{TH}$ and in which AP is greater and/or equal to $A_{TH-P}$, a state of wear of the cutting sections 8 of said cutter 4 is associated, which is therefore to be replaced;

while to the condition in which $E_{TA}$ is lower than $E_{TH}$, or to the condition in which $A_P$ is lower than $A_{TH-P}$ (even if $E_{TA}$ is greater and/or equal to $E_{TH}$), a state is associated in which the cutting portions 8 of said cutter 4 are still efficient, and therefore it is not necessary to replace the cutter.

Conveniently, in this way, the method is more robust since only the information relating to the peak of absorbed current and/or torque exerted are not particularly indicative because it could also indicate a situation of cutting a particularly hard material, or a very thick key or a very deep cut. Advantageously, however, by correlating the peaks of current absorption by the motor (and in particular the amplitude and/or area of said peaks) to the "historical" value of the energy absorbed by the motor during all the work cycles of the cutter (corresponding to the value of the counter $E_{TA}$)—and preferably considering whether $E_{TA}$ is close (i.e., slightly lower) or higher than the threshold value $E_{TH}$—a state is more reliably identified in which the cutting sections 8 of the cutter 4 they are worn and need to be replaced.

Advantageously, the implementation of the method of FIG. 4 can be particularly useful in the condition in which with a cutter 4 already used, and having the cutting portions 8 already partially worn, it is used to cut a key of soft material, such as for example aluminum.

Figure 7:
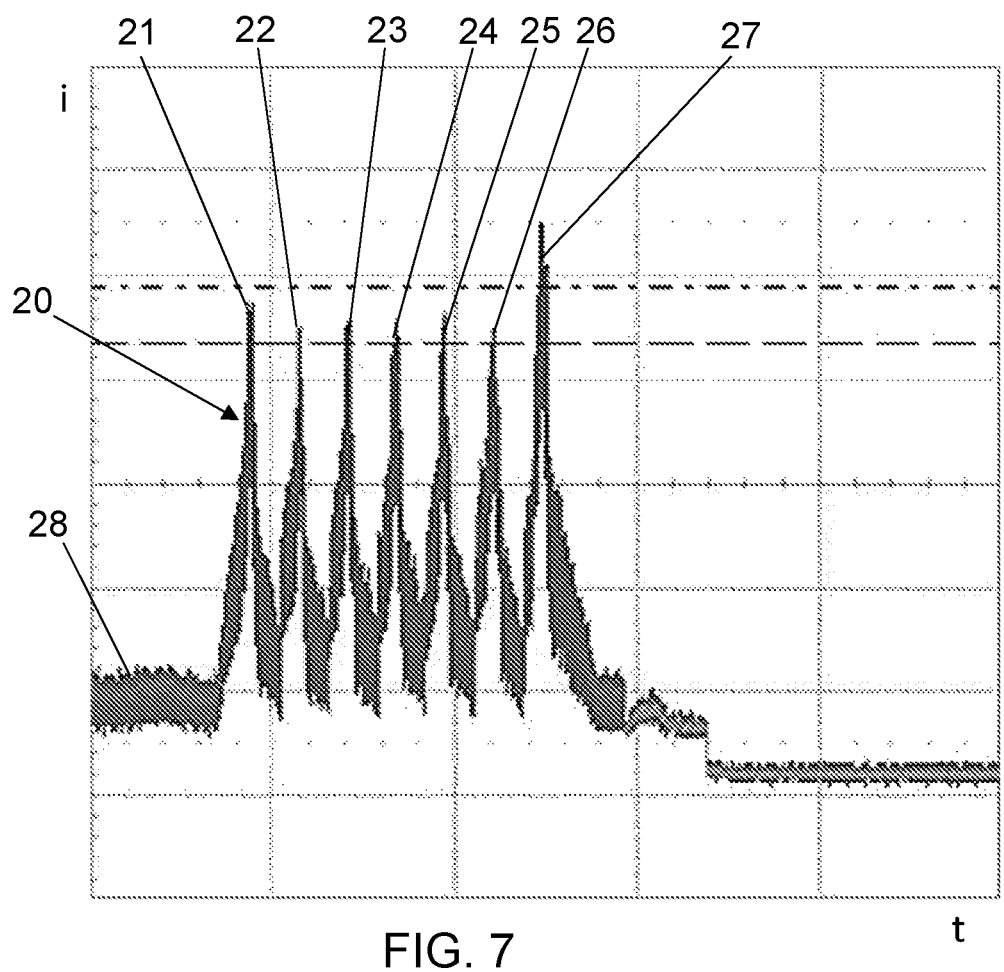
FIG. 7 shows an example of the current absorption profile of the cutter rotation motor during a cutting cycle of a key by means of said cutter.

Conveniently, in FIG. 7 shows the profile 20 of current I absorbed by the rotation motor 5 of the cutter 4 during a cutting cycle. In particular, the seven peaks 21-27 correspond to the seven slots to be cut on respective seven areas of the key stem and this in order to define the bitting of said key. The width/height of the current absorption peaks 21-27 I is correlated to the depth of each cut to be made in correspondence with each of said seven zones. Furthermore, the initial section 28 of the profile 20, before the first peak 21, conveniently corresponds to the phase in which the motor 5 is on but the cutter 4 has not yet come into contact with the key 3 on which to make the cuts.

Advantageously, the method according to the invention can also comprise the execution of at least two control cuts and/or of at least two control cutting cycles, to be carried out at different moments of the useful life of the cutter 4 and both in the same conditions, preferably under known and/or predefined conditions.

In particular, these cuts/control cutting cycles are carried out on the same "sample" key (i.e., of the same material and thickness) with the same rotation speed of the cutter (cutting speed). Preferably, moreover, if an entire cutting cycle is carried out on the sample key (i.e., a plurality of cutting operations to be carried out along successive areas of the stem in order to define a complete bitting), then also the speed of advancement of the carriages on which it is mounted the key to be cut and the bitting profile to be obtained on the key (in terms of both number of cuts and their depth) are mounted, they remain the same between the two control cycles.

Advantageously, as mentioned, the cut or the control cutting cycle is performed at least twice and, in particular, once when a new cutter 4 is installed (i.e., at the beginning of its useful life) and a second time after a certain number of cutting cycles (i.e., during its useful life); the corresponding energy values absorbed by the cutter rotation motor 5, during said two control cuts or at least two control cutting cycles, are suitably compared to each other to determine if there is wear of the cutting portions 8 of said cutter 4 and/or to quantify the wear of the cutting sections 8 of said cutter 4.

In particular, the method provides for detecting the current I and/or voltage V which is absorbed/consumed/required by the motor 5 and/or of the torque C exerted by the rotation motor 5 of the new cutter 4 during a first cut or during a first control cutting cycle carried out at the time of installation of the new cutter 4; to calculate the corresponding power and energy value $E_{REF}$ and to store the latter as a reference value. Conveniently, the method provides for detecting the current I and/or voltage V which is absorbed/consumed/required by the motor 5 and/or of the torque C exerted by the rotation motor 5 of the new cutter 4 during a further (second and subsequent) control cut or control cutting cycle which is performed after a certain number of operating cutting cycles carried out by the cutter 4; to calculate, and preferably memorize, the corresponding power and energy value $E_{CHECK}$.

Conveniently, by comparing the energy value (corresponding to $E_{REF}$), which the motor 5 absorbs during the first cut or control cutting cycle carried out when the cutter is new, with that (corresponding to $E_{CHECK}$) detected during the next and further cut or control cutting cycle which is carried out when the cutter has already been used, as well as on the basis of a predefined threshold value $\Delta E$, it is defined whether the cutting sections 8 of the cutter 4 are worn and/or the state of wear of the cutting portions 8 of said cutter 4. Preferably, the threshold value $\Delta E$ is predetermined empirically.

Conveniently, by setting a series of threshold values $\Delta E$ they can be defined, according to the same methods described above—i.e., by comparing ($E_{REF}$–$E_{CHECK\_LAST}$), or ($E_{CHECK\_LAST}$–$E_{CHECK\_LAST-1}$), with said series of threshold values $\Delta E$–a plurality of states, each of which corresponds to a different state/level of wear of the cutting sections 8 of said cutter 4.

Preferably, the method provides for evaluating whether ($E_{CHECK}$–$E_{REF}$) is greater or less than said threshold value $\Delta E$ and, in particular, we have that:
- to the condition in which ($E_{CHECK}$–$E_{REF}$) is greater than and/or equal to $\Delta E$, is associated with a state of wear of the cutting sections 8 of said cutter 4, which is therefore to be replaced;
- while the condition in which ($E_{CHECK}$–$E_{REF}$) It is less than $\Delta E$, is associated with a state in which the cutting sections 8 of said cutter 4 are still efficient, and therefore it is not necessary to replace the cutter.

Preferably, this comparison can take place before the start of a new operational cutting cycle or at the end of an operational cutting cycle.

Advantageously, this method of detecting wear is particularly immediate and robust, however it is less convenient as it requires the use of a sample key (preferably of the "standard" type) and direct user intervention is required in order to perform a control cutting cycle.

Figure 5:
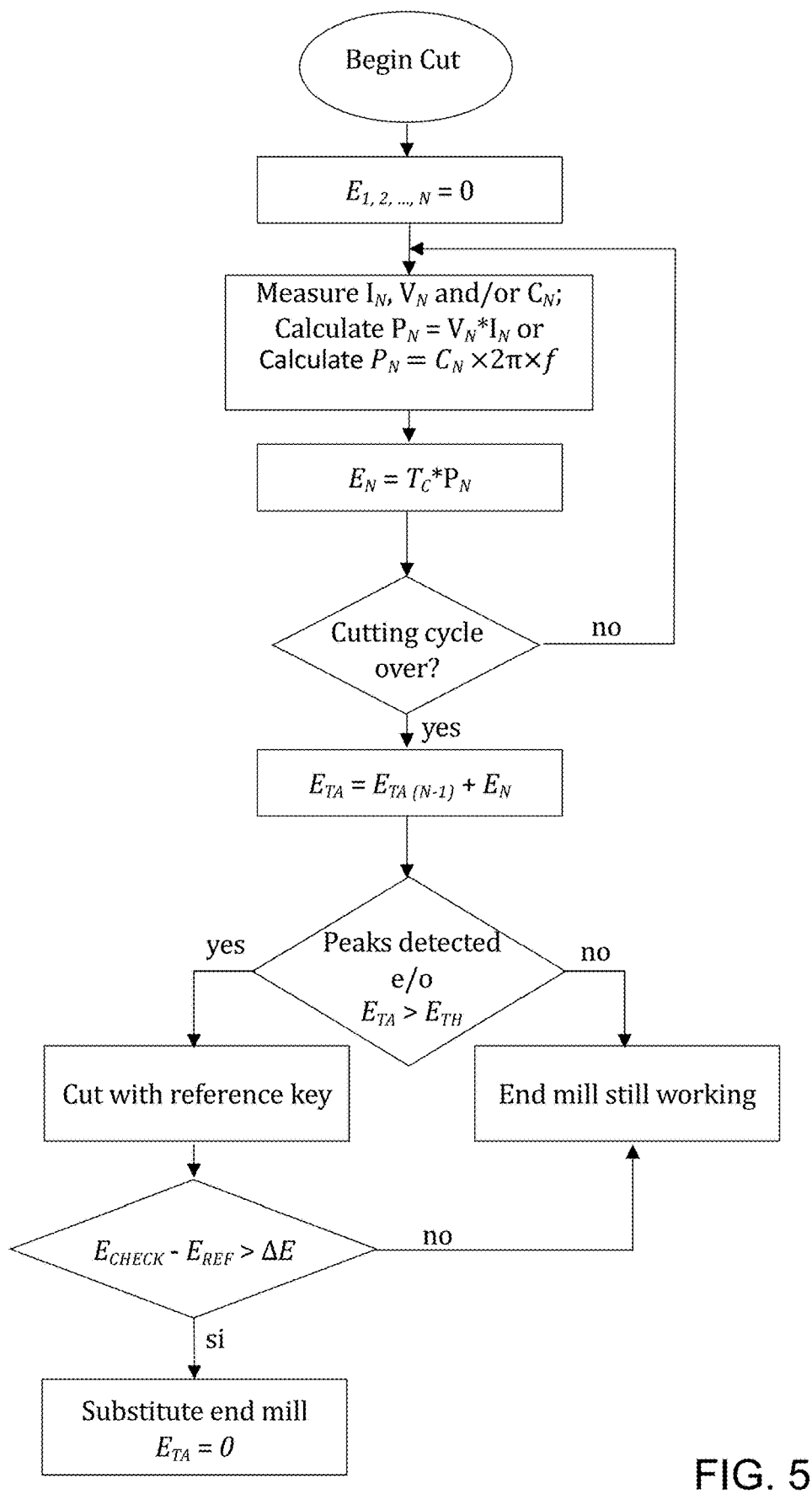
FIG. 5 shows a block diagram of a third embodiment of the method according to the invention.

Advantageously, in its implementation form shown in FIG. 5, the method provides for a combination of the previously described implementations. In particular, the method according to the invention provides for carrying out a first control cutting cycle at the time of installation of the new cutter 4, in order to obtain and thus store the $E_{REF}$ value. In addition to this, in order to decide when to carry out a further and subsequent control cutting cycle (to be carried out in any case after the cutter 4 has been used), the amount of energy absorbed by the rotation motor 5 of the cutter 4 during all the cutting cycles carried out with that specific cutter (i.e., based on $E_{TA}$) and/or on the characteristics of the current absorption peaks I by the motor 5 and/or torque exerted by the motor 5 for rotation of the cutter 4 during an operational cutting cycle.

More in detail, said at least one further and subsequent control cutting cycle can be performed when:
- the amount of energy absorbed by the motor 5 of rotation of the cutter 4 during all the cutting cycles carried out with that specific cutter is greater than a given threshold value, i.e., when $E_{TA}$ is greater than or equal to $E_{TH}$, and/or
- the amplitude and/or area of the absorbed current peaks ($A_P$) and/or of the torque exerted during a determined operating/effective cutting cycle is greater than a corresponding predetermined threshold value $A_{TH-P}$.

More in detail, according to the implementation of the method represented in FIG. 5, a first test cycle is carried out when a new cutter 4 is installed and the corresponding value of energy absorbed by the motor 5 is thus stored as the reference value $E_{REF}$.

Conveniently then for each cutting cycle "n" a value of energy $E_N$ absorbed by the motor in that cycle is measured—in the manner described above—and this value is added (accumulated) to the value of energy absorbed by the motor 5 of rotation of the cutter 4 during all the previous cutting cycles carried out with that specific cutter, thus obtaining an $E_{TA}$ value.

Conveniently, the total accumulated value $E_{TA}$ (preferably expressed in Wh) is compared with a predetermined threshold value $E_{TH}$ and, when $E_{TA}$ is greater than $E_{TH}$, it is required to carry out a further test cutting cycle. Basically, the further test cutting cycle is performed when $E_{TA} > E_{TH}$ and from this a corresponding absorbed energy value $E_{CHECK}$ is obtained which can preferably be stored. Conveniently, the execution of the further test cutting cycle can also be decided on the basis of the characteristics of the current peaks I absorbed by the motor 5 and/or of the torque C exerted by the motor 5 of rotation of the cutter 4 during the last cutting cycle made.

Conveniently, comparing the energy values absorbed when the cutter is new (i.e., it has not yet been used), i.e., $E_{REF}$, with those of the cutter used (i.e., $E_{CHECK}$), and on the basis of a predefined threshold value $\Delta E$, one thus confirms whether the cutting portions 8 of said cutter 4 are worn or not.

Conveniently, in its further embodiment, the method according to the invention can provide for continuing to use the cutter 4 even after having identified—according to one of the methods described above—a state of wear of the cutting sections 8 of said cutter 4. Advantageously, however, in this case, the rotation speed of the cutter 4 and/or the advancement speed of the key to be cut 3 is appropriately and correspondingly controlled with respect to the cutter 4 (and corresponding to the advancement speed of the carriages 15, 17 on which the key blank to be cut is mounted).

Furthermore, a first threshold value $E_{TH1}$ can be preferably provided in order to identify a state of wear of the cutting sections 8 of said cutter 4 such that the cutter itself can continue to be used in a suitably controlled manner, and a second threshold value $E_{TH2}$ in order to identify a limit situation in which the state of wear of the cutting sections 8 of said cutter 4 is such as to require immediate replacement of the cutter 4.

Advantageously, once a condition corresponding to a state of wear of the cutting portions 8 of said cutter 4—preferably defined by a condition in which the amount of energy absorbed by the motor 5 of rotation of the cutter 4 during all the cutting cycles carried out with that specific cutter is greater than a given threshold value, i.e., when $E_{TA}$ is greater than or equal to $E_{TH1}$—during the next cutting cycle, the motor 5 of the cutter 4 and/or the feed motors of the carriages 15, 17 on which the key blank to be cut is mounted is suitably and correspondingly controlled. In particular, for this purpose, the motor 5 is controlled so as to reduce the rotation speed (and therefore the cutting speed) of the cutter and/or the motors of the carriages 15, 17 are controlled so as to reduce the advancement speed of the key 3 with respect to the cutter 4.

Preferably, the method provides for reducing the rotation speed of the cutter 4 and/or the advancement speed of the key 3 with respect to the cutter 4 on the basis of the characteristics of the current peaks I absorbed by the motor 5 and/or of torque C exerted by the rotation motor 5 of said cutter 4. Conveniently, the greater the amplitude and/or the area of these peaks, the greater are the aforementioned speed reductions.

Appropriately, therefore, in this way, a high/better quality of the result is guaranteed (i.e., of the bitting cut on the key) at the maximum speed that can be used in the face of that determined state of wear of the cutting sections 8 of the cutter 4. For example, in the case in which a key 3 in soft material (for example in brass) is cut, the reduction in the rotation speed of the cutter 4 and/or the advancement of the key 3 with respect to the cutter 4 will be of little significance or even may not exist, on the contrary, in the case in which a key is cut in hard material (for example in steel), the reduction of the rotation speed of the cutter 4 and/or the advancement of the key 3 compared to the cutter 4 may also be very important with respect to the nominal speed or at the speed used in conditions of cutter 4 having cutting edges 8 not worn.

Advantageously, the method according to the invention can provide, before starting a work cycle, a preliminary check on the state of wear of the cutting sections 8 of said cutter 4 which, conveniently, can be carried out according to one of the methods described above.

Figure 6:
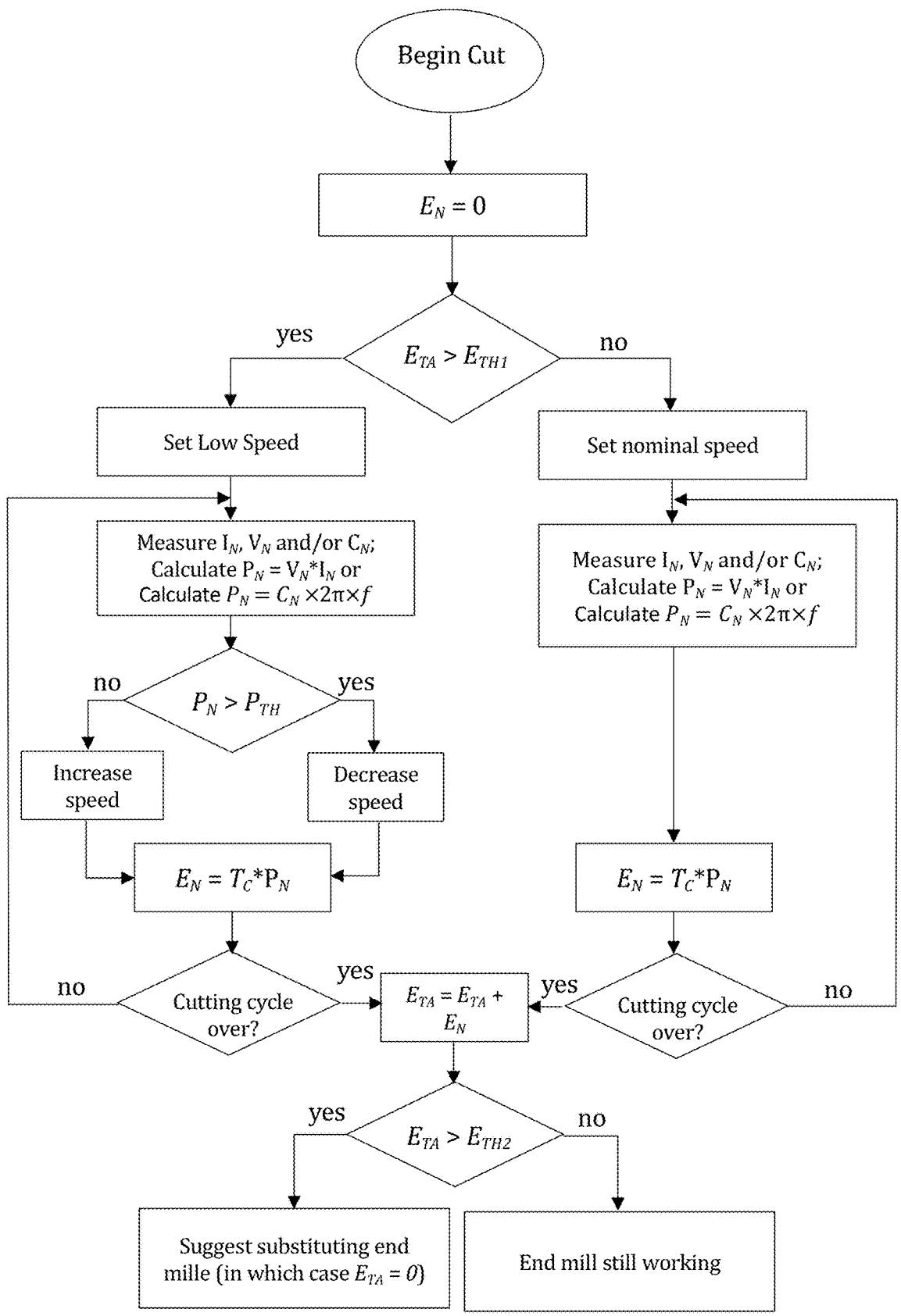
FIG. 6 shows a block diagram of a fourth embodiment of the method according to the invention.

Preferably, as shown in FIG. 6, this preliminary check can be carried out on the basis of the energy absorbed by said motor 5 during all previous cutting cycles carried out with said cutter 4 (i.e., using the counter $E_{TA}$, as described above, and comparing it with the threshold value $E_{TH}$).

Conveniently, when, following said preliminary check, a condition is identified in which the cutting portions 8 of said cutter 4 are still efficient (preferably when $E_{TA}$ is not higher than $E_{TH}$), the rotation and feed speeds of the cutter 4 of key 3 with respect to the cutter are and/or remain the nominal ones.

On the contrary, when following said preliminary check, a condition is identified in which the cutting portions 8 of said cutter 4 are worn (preferably when $E_{TA}$ is higher than $E_{TH}$), the rotation speed of the cutter 4 and/or the advancement speed of the key 3 with respect to said cutter is reduced, preferably in a suitably and correspondingly controlled manner. Advantageously, the rotation speed of the cutter 4 and/or the advancement speed of the key to be cut 3 with respect to said cutter (4), is reduced/are reduced with respect to corresponding speed values which are predefined and, preferably, correspond to values which are used when the cutting sections 8 of the cutter 4 are not worn.

Advantageously, moreover, in this case, during the execution of the key cutting cycle, it is calculated—on the basis of the detected values of current I and voltage V absorbed by the motor 5 and/or of the torque C exerted by the motor 5 of rotation of the cutter 4—the power P and/or the energy absorbed by said motor. Conveniently, the value P thus calculated is compared with a predetermined threshold value PTH; if the threshold value is exceeded (i.e., when P is greater than $P_{TH}$), an increase in the rotation speed of the cutter 4 and/or the advancement speed of the key 3 with respect to the cutter is substantially controlled in real time and during the execution of the same cutting cycle; on the contrary, if the threshold value is not exceeded (i.e., when P is lower than $P_{TH}$), a decrease in the rotation speed of the cutter 4 and/or the speed of advancement of the key 3 with respect to the cutter is substantially controlled in real time and during the execution of the same cutting cycle.

Conveniently, in this way, in the condition of worn cutting sections 8, the rotation speed of the cutter 4 and/or the advancement speed of the key 3 is adapted—substantially in real time and during the execution of the same cutting cycle—to the cutter, thus optimizing both the quality and the cutting times.

Conveniently, in any case, at the end of the work cycle, a final check is carried out on the state of wear of the cutting sections 8 of said cutter 4 which, suitably, can be carried out according to one of the methods described above.

Preferably, as shown in FIG. 6, this preliminary check can be carried out on the basis of the energy absorbed by said motor 5 during all the cutting cycles carried out with said cutter 4 (i.e., using the counter $E_{TA}$ as described above and comparing it with the threshold value $E_{TH}$), including the one just finished.

Conveniently, at the end of the cutting cycle, the total accumulated value $E_{TA}$ (preferably expressed in Wh) is compared with a predetermined threshold value $E_{TH2}$ and to the condition in which $E_{TA}$ is greater and/or equal to $E_{TH2}$, it is associated a state of wear of the cutting sections 8 of said cutter 4 such as to require prompt replacement; while the condition in which $E_{TA}$ is not higher than $E_{TH2}$ is associated with a state in which the cutting portions 8 of said cutter 4 are still efficient, and therefore it is not necessary to replace the cutter.

Conveniently, the processor of the milling device 11 according to the invention is configured to implement the method according to the invention.

Conveniently, for this purpose, as mentioned, the processor of the milling device 11 is connected to the instrument for measuring the current I and voltage V absorbed by the motor 5 and/or the torque C exerted by the motor 5 for rotation of the cutter 4 in a manner that the processor receives at its input the corresponding values and/or signals of current and voltage measured, and appropriately sampled, and this in order to then use them to carry out the subsequent processing and comparisons provided for in the method according to the invention.

Conveniently, the processor of the milling device 11 is connected with the rotation motor 5 of the cutter 4 so as to send suitable control signals to said motor, as possibly provided in the method according to the invention.

Conveniently, the milling device 11 comprises and/or is associated with an indicator, for example a display or a light indicator, which is connected to said processor and which, on the basis of corresponding signals received by the processor, is configured to signal to the operator if the cutting sections 8 of said cutter 4 are worn and/or the state of wear of said cutting sections 8 of said cutter 4. Advantageously, the display or the indicator light can be that of a key-duplicating machine in which installed a milling device 11 as described above.

The invention also relates to a key-duplicating machine comprising at least one milling device 11 configured to implement a method according to the invention and as described above.

From what has been said it is clear that the method and the milling device according to the invention are particularly advantageous in that:

allow to reliably measure the state of wear of the cutter cutting sections and this in order to alert the operator and/or to control correspondingly the subsequent cutting cycles in order to optimize the quality and speed of the bitting cuts even in presence of cutter with worn cutting sections, they are easy and simple to implement and, in particular, involve the use of measuring instruments already widely available on the market, they are simple, quick and inexpensive to make and use.

The present invention has been illustrated and described in a preferred embodiment thereof, but it is understood that executive variations may be applied to it in practice, without however departing from the scope of protection of the present patent for industrial invention.

The invention claimed is:

1. Key-duplicating machine with at least one milling device (11) comprising:
    at least one cutter (4) which is provided with cutting sections (8) to obtain the bitting cuts on a key (3),
    an electric motor (5) to cause the rotation of said cutter (4),
    at least one processor which is electronically connected to said electric motor (5) for the control and command of the electric motor,
    at least one instrument that is configured to detect at least one of: a current (I) or voltage (V) absorbed or required by said cutter (4) rotation motor (5) during at least one cutting cycle carried out by said cutter (4), and to send at least one of: values or signals thus detected to said at least one processor,
    and said at least one processor is configured to implement a method for detecting wear of said cutter (4), said method comprising:
        detecting, during at least one cutting cycle carried out by said cutter (4), at least one of: values of current (I) or voltage (V) absorbed or required by said motor (5) for rotation of cutter (4) or motor torque values (C) exerted by said motor (5);
        calculating, based on the values thus detected, an energy absorbed by said motor (5) of rotation of the cutter (4) and at least one of: determining, on the basis of the energy thus calculated, if there is wear of the cutting portions (8) of said cutter (4) or quantifying the wear of the cutting portions (8) of said cutter (4);
        calculating the energy absorbed by said motor (5) during all subsequent cutting cycles carried out with said cutter (4) using a counter ($E_{TA}$) which is initialized at the beginning of the useful life of the cutter (4) and which is then correspondingly increased with the energy absorbed by said motor (5) of rotation of the cutter (4) during each cutting cycle carried out with said cutter;
        recording characteristics of the current absorption peaks (I) by the motor (5) of rotation of the cutter (4) during at least one cutting cycle,
        comparing the energy thus calculated with at least a predefined threshold value ($E_{TH}$) and the characteristics of said peaks are used to at least one of: determine if there is wear of the cutting portions (8) of said cutter (4) or to quantify wear of the cutting portions (8) of said cutter (4),
    and wherein said at least one processor is configured to implement a method wherein the total accumulated value $E_{TA}$ is compared with the predetermined threshold value $E_{TH}$ and also the amplitude of the absorbed current peaks ($A_P$) by the motor (5) and/or the torque C exerted by said motor (5) during that determined cutting cycle is compared with a corresponding predetermined threshold value $A_{TH-P}$ and following said comparison:
        the condition in which $E_{TA}$ is greater than or equal to $E_{TH}$ and in which $A_P$ is greater than or equal to $A_{TH-P}$, a state of wear of the cutting sections (8) of said cutter (4) is associated, which is therefore to be replaced;
        while to the condition in which $E_{TA}$ is lower than $E_{TH}$, or to the condition in which $A_P$ is lower than $A_{TH-P}$ even if $E_{TA}$ is greater and/or equal to $E_{TH}$, a state is associated in which the cutting portions (8) of said cutter (4) are still efficient, and therefore it is not necessary to replace the cutter.

2. The key-duplicating machine according to claim 1, wherein said at least one processor is configured to implement a method that calculates at least one of: the amplitude/height or the time/speed of growth of the peaks of the current absorbed by the motor (5); or the torque (C) exerted by the motor (5) of rotation of the cutter (4), and uses calculated values to determine, on the basis thereof, at least one of: if the cutting sections (8) of the cutter (4) are worn; or the state wear of said cutting portions (8).

3. The key-duplicating machine according to claim 1, wherein said at least one processor is configured to implement a method wherein:
    the values of at least one of: current (I) or voltage (V) absorbed/required by said motor (5) for rotation of the cutter (4), or torque (C) exerted by said motor (5) rotation of the cutter (4), during at least two cuts or control cutting cycles which are carried out by said cutter (4) under the same operating cutting conditions but at different moments of the useful life of said cutter (4),
    the values thus detected are used during said at least two cuts or control cutting cycles to at least one of: determine if there is wear of the cutting sections (8) of said cutter (4) or to quantify the wear of the cutting sections (8) of said cutter (4).

4. The key-duplicating machine according to claim 3, wherein said at least one processor is configured to implement a method wherein said at least two cuts or control cutting cycles are carried out:
    on a key (3) of the same material and thickness,
    with the same rotation speed of the cutter (4),
    and:
        with the same advancement speed of the key to be cut (3) compared to the cutter (4) which is at least one of: predefined or known,
        so as to define on said key to be cut (3) the same bitting profile in terms of number and depth of the cuts that define the bitting of said key (3).

5. The key-duplicating machine according to claim 3, wherein said at least one processor is configured to implement a method wherein:
    a first cut or control cutting cycle is carried out at the beginning of the useful life of said cutter (4) and thus the corresponding value of energy ($E_{REF}$) absorbed by the rotation motor (5) of the cutter (4) for the execution of said first control cutting cycle is stored,
    at least one further and subsequent cut or control cutting cycle is carried out during the useful life of said cutter (4) and after the cutter (4) has already been used to define a certain number of cuts, and thus the corresponding value of energy ($E_{CHECK}$) absorbed by the motor (5) of rotation of the cutter (4) for the execution of said further and subsequent control cutting cycle, this value of energy ($E_{REF}$) absorbed by the motor (5) of rotation of the cutter (4) is used, for the execution of said first cut or control cutting cycle, and said energy value ($E_{CHECK}$) absorbed by the motor (5) for rotation of the cutter (4), for the execution of said further and subsequent cut or control cutting cycle, to at least one of: determine if there is wear of the cutting sections (8) of said cutter (4) or to quantify the wear of the cutting portions (8) of said cutter (4).

6. The key-duplicating machine according to claim 3, wherein said at least one processor is configured to implement a method wherein said at least one further and subsequent cutting or control cutting cycle is carried out:

when the energy absorbed by said motor (5) during all subsequent cutting cycles carried out with said cutter (4), is preferably measured using a counter ($E_{TA}$) which is initialized at the start of the useful life of the cutter (4) and which is then correspondingly increased with the energy absorbed by said motor (5) of rotation of the cutter (4) during each cutting cycle carried out with said cutter, is greater than at least a predefined threshold value ($E_{TH}$), and/or on the basis of the characteristics of the current absorption peaks (I) by the motor (5) of rotation of the cutter (4) during the last cutting cycle carried out by said cutter (4).

7. The key-duplicating machine according to claim 1, wherein said at least one processor is configured to implement a method wherein said measured values are used to at least one of: define the wear of the cutting portions (8) of said cutter (4), or the state of wear of said portions cutting edges (8) of said cutter, to set or control correspondingly the rotation speed of the cutter (4) or the advancement speed of the key to be cut (3) with respect to said cutter (4).

8. The key-duplicating machine according to claim 1, wherein said at least one processor is configured to implement a method wherein, if or when the at least one processor identifies a state of wear of the cutting sections (8) of said cutter (4), at least one of: the rotation speed of the cutter (4) or the advancement speed, with respect to said cutter (4), of the keys to be cut (3) are reduced with respect to corresponding speed values which are predefined and correspond to those used when the cutting sections (8) of the cutter (4) are not worn.

9. The key-duplicating machine according to claim 1, wherein said at least one processor is configured to implement a method wherein:

calculating, during the execution of a cutting cycle, the values of at least one of: current (I) or voltage (V), absorbed or required by said motor (5) for rotation of the cutter (4), or torque (C), exerted by said cutter (4) rotation motor (5), or the corresponding power or energy absorbed or required by said cutter (4) rotation motor (5), using, during the execution of the same cutting cycle, the values thus detected or calculated to control, correspondingly and in real time, at least one of: the rotation speed of the cutter (4) or the feed speed of the key to be cut (3) with respect to said cutter (4).

10. The key-duplicating machine according to claim 9, wherein the milling device (11) comprises or is associated with an indicator, which is connected to said at least one processor and which is configured to signal to the operator at least one of: whether the cutting sections (8) of said cutter (4) are worn or the state of wear of said cutting portions (8) of said cutter (4).

11. The key-duplicating machine according to claim 1, wherein the at least one processor receives, from the measuring instrument associated or incorporated with the motor (5), at least one of: the values (I) of current, and (V) of voltage absorbed by the motor (5), or of torque (C) exerted by the motor (5).

12. The key-duplicating machine according to claim 1, wherein the at least one processor measures the voltage (V) and the current (I) absorbed by the motor (5) and the torque (C) exerted by the motor (5) according to a predefined sampling time ($T_c$); the at least one processor receiving a time sequence of voltage ($V_n$) and current ($I_n$) and torque ($C_n$) values.

* * * * *